(12) United States Patent
Muhonen et al.

(10) Patent No.: US 7,120,449 B1
(45) Date of Patent: Oct. 10, 2006

(54) LOCATION DETERMINATION IN TELECOMMUNICATION NETWORK

(75) Inventors: Ahti Muhonen, Hirvihaara (FI); Jens Staack, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 209 days.

(21) Appl. No.: 10/110,639

(22) PCT Filed: Oct. 13, 2000

(86) PCT No.: PCT/FI00/00892

§ 371 (c)(1),
(2), (4) Date: Aug. 29, 2002

(87) PCT Pub. No.: WO01/28275

PCT Pub. Date: Apr. 19, 2001

(30) Foreign Application Priority Data

Oct. 15, 1999 (FI) ................................. 19992236

(51) Int. Cl.
*H04Q 7/20* (2006.01)
(52) U.S. Cl. ............... 455/456.1; 455/456.2; 455/456.3
(58) Field of Classification Search ............ 455/456.1, 455/456.2, 456.3, 456.4, 456.5, 456.7, 433, 455/513, 432.1; 342/575.13
See application file for complete search history.

(56) References Cited

U.S. PATENT DOCUMENTS

| 4,982,332 | A | | 1/1991 | Saito et al. |
|---|---|---|---|---|
| 5,365,451 | A | | 11/1994 | Wang et al. |
| 5,732,387 | A | | 3/1998 | Armbruster et al. |
| 5,787,359 | A | | 7/1998 | Nagata |
| 5,883,595 | A | | 3/1999 | Colley |
| 6,021,327 | A | * | 2/2000 | Nguyen et al. .............. 455/433 |
| 6,064,890 | A | * | 5/2000 | Hirose et al. ................ 455/513 |
| 6,236,938 | B1 | * | 5/2001 | Atkinson et al. ........... 701/214 |
| 6,347,227 | B1 | * | 2/2002 | Johansson ................ 455/456.1 |
| 6,463,288 | B1 | * | 10/2002 | Havinis et al. .......... 455/456.1 |
| 6,477,380 | B1 | * | 11/2002 | Uehara et al. ........... 455/456.1 |
| 2003/0222820 | A1 | * | 12/2003 | Karr et al. ................... 342/457 |

FOREIGN PATENT DOCUMENTS

| EP | 987 914 | 3/2000 |
|---|---|---|
| GB | 2 247 800 | 3/1992 |
| WO | WO 99/62284 | 12/1999 |

* cited by examiner

*Primary Examiner*—George Eng
*Assistant Examiner*—Phuoc Doan
(74) *Attorney, Agent, or Firm*—Pillsbury Winthrop Shaw Pittman LLP (57) ABSTRACT

The invention relates to a method for supporting location determination of a mobile station, in which method location data are stored in and deleted from a memory, each location data item describing the location of the mobile station measured at a given measuring moment. Furthermore, in the method, a distance parameter and/or a target level corresponding to the distance parameter is determined at least for some of the stored location data; and deletion of the location data is at least partly based on the distance parameter and target level.

17 Claims, 6 Drawing Sheets

LOCATION DETERMINATION IN TELECOMMUNICATION NETWORK

This is a National Stage application of International Application No. PCT/FI00/00892, which was filed on Oct. 13, 2000, which designated the U.S., and was filed in the English language.

FIELD OF THE INVENTION

The invention relates to a method for supporting location determination of a mobile station in a telecommunication network particularly such that, in the method, location determination data are selectively stored.

BACKGROUND OF THE INVENTION

A typical mobile communication system covers a large geographical area and comprises a plurality of cells, each of the cells being generally served by one base station. The cells vary greatly in size, usually depending on the call traffic in the area. Cell size is generally smaller in areas with high traffic density than in regions where fewer calls are established. Regardless of the cell size, on many occasions it would be useful to know the geographical location or direction of travel of a mobile station.

Location information on a mobile station can be used for many purposes. If desired, the user can determine his or her own location, call charging can be location-dependent or the location of a mobile station placing an emergency call can be determined so that help could be sent. For instance, vehicles may carry an arrangement for an automatic emergency call in case of an accident, the emergency call also comprising information on the vehicle's location.

Several methods have been developed for measuring the location of mobile stations. For instance, the distance of a mobile station from a base station with which the mobile station communicates can be measured on the basis of a signal propagation delay. However, it is not relevant to the operation of the present invention how the location data is measured, and therefore, as regards location measurement, reference is made to GSM specification (GSM 02.71) and to WO 98/16078, for instance. It is obvious to the person skilled in the art that location measurement can also be carried out by employing other methods than those disclosed in said publications.

The above location measurement methods have a common feature that if post-measurement location determination, i.e. interpretation of the measurement results, employs only the last measurement, the accuracy of the determined location equals that of the measurement concerned. Inaccuracy in a location determined by one-point method can be several hundreds of meters, depending on the location measurement method. Consequently, when the mobile station moves in the vicinity of an oblong natural obstacle, it may be difficult to determine on which side of the obstacle the mobile station is located.

Hence, when the mobile station is located on one side of an oblong natural obstacle, such as a river, lake, park, hill or railway, it may happen that due to inaccuracy in the location measurement method it is not known, in case of traffic accident, on which side of the natural obstacle the emergency vehicle should be sent.

BRIEF DESCRIPTION OF THE INVENTION

The object of the invention is to provide a method and equipment implementing the method such that the above problem can be solved. This is achieved by the method and system which are characterized by what is disclosed in the independent claims. The preferred embodiments of the invention are disclosed in the dependent claims.

Two embodiments of the invention are described, in both of which embodiments specific location measurement results obtained at different locations at different time instants are stored in a memory element such that the location information to be stored is selected by means of at least one parameter either at the storing stage or later on. The parameters are characterized in that they can be calculated from the measurement results and/or the time instants of the measurements.

In a first embodiment of the invention, a location parameter is weighted more than a time instant parameter, and an aim is to delete measurement results corresponding to locations between which the mobile station has moved least. The first embodiment is based on the idea that a distance parameter can be determined for at least some of the stored location data and deletion of the location data can at least partly be based on said distance parameters.

A second embodiment of the invention is based on an inventive idea similar to that of the first embodiment, but in this embodiment the time instant parameter is weighted more than the location parameter. According to the second embodiment of the invention, there are a plurality of measurement results of various ages in the memory, but of the older measurement results a proportionally smaller number is stored than of the newer ones. In the second embodiment of the invention, an age parameter can be determined for at least some of the location parameters in the memory, and location data deletion can at least partly be based on said age parameters.

According to the invention and preferred embodiments and modifications thereof, the location measurement results of the mobile station can be interpreted better than before by using previously determined locations when interpreting data on a new, i.e. the most recent, location.

According to a preferred embodiment of the invention, measurement results are deleted on the basis of a timer.

According to another preferred embodiment of the invention, prior to storing a new location data estimate of the mobile station, at least one stored location data estimate is deleted according to a predetermined mathematical function. An estimate refers to a measured location of the mobile station within the limits of accuracy of the measuring method.

A primary advantage of the method and system of the invention and preferred embodiments and modifications thereof is that combination of consumption control of memory required for storing location determination data and accuracy in location history can be parameterized in a readily understandable form. A further advantage of the method and system of the invention and preferred embodiments thereof is more reliable location determination of a mobile station than what is achieved by current methods, in particular as regards natural obstacles. This is achieved by utilizing existing methods and location measurement processing according to the invention.

BRIEF DESCRIPTION OF THE DRAWINGS

In the following, the invention will be described in greater detail in connection with the preferred embodiments, with reference to the attached drawings, wherein.

DETAILED DESCRIPTION OF THE INVENTION

Figure 1:
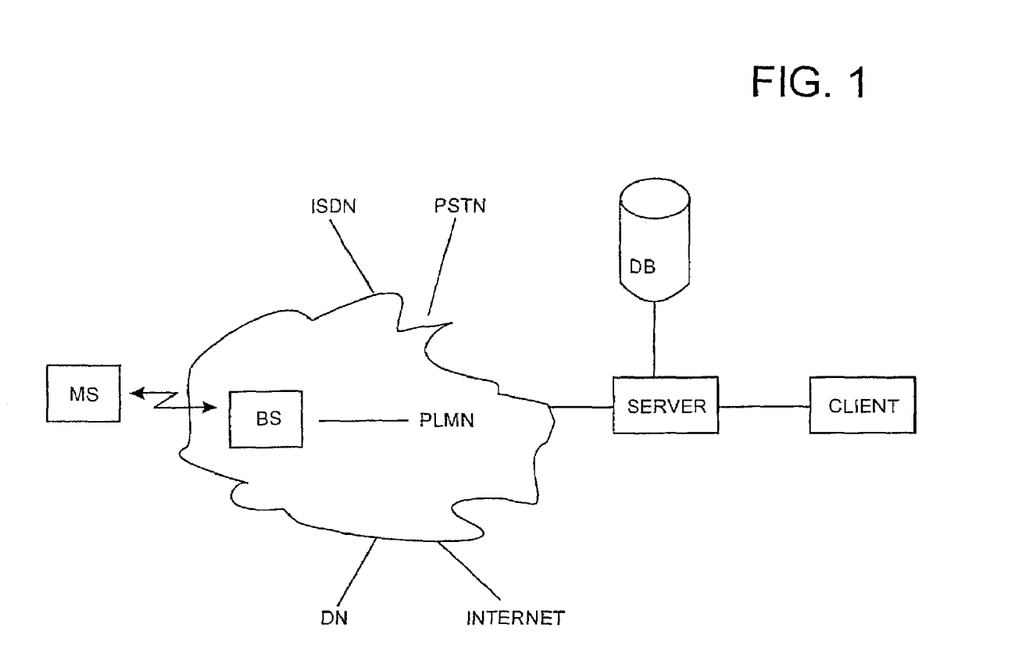
FIG. 1 illustrates a system to which the invention can be applied.

FIG. 1 illustrates a system to which the invention can be applied. In FIG. 1, a mobile station MS is connected over a radio path to a public land mobile network PLMN via a base station BS. In a manner known per se, it is possible to establish connections from the PLMN to other telecommunication networks, such as a public switched telephone network PSTN, integrated services digital network ISDN, data network DN or the Internet (TCP/IP networks).

An example of the PLMN is the GSM. The detailed structure and operation of the GSM network are not relevant to the invention, and therefore as regards them, reference is made to the GSM standards of the European Telecommunications Standards Institute ETSI. It should be noted, however, that the invention can also be applied to other telecommunication networks, such as NMT, AMPS, TACS, D-AMPS, DCS, JDS, CDMA, WCDMA, and/or to wireless data transmission, such as Mobile-IP (Internet-Protocol).

In FIG. 1, SERVER designates a server controlling a database DB in which location data of a mobile station are stored. CLIENT designates a client, for instance a regional emergency centre, a rescue centre or a centre that provides traffic information and is interested in the location of the mobile station. The task of the server SERVER can be, for instance, to identify a client and a service request thereof, to communicate with the batabase in order to implement the client's service request and to transmit data in response to the client's service request to the client. In FIG. 1, SERVER is depicted outside the PLMN but it is obvious that it can be integrated in the PLMN, for instance.

Alternatively, an equipment capable of location measurement, such as a GPS (Global Positioning System) receiver and a database, can be integrated in the mobile station, whereby no interactivity with the network is needed for measuring the location of the mobile station and storing the location data. Other, alternative locations of the location update equipment, database, server and client are also within the scope of the invention and the preferred embodiments thereof.

Figure 2:
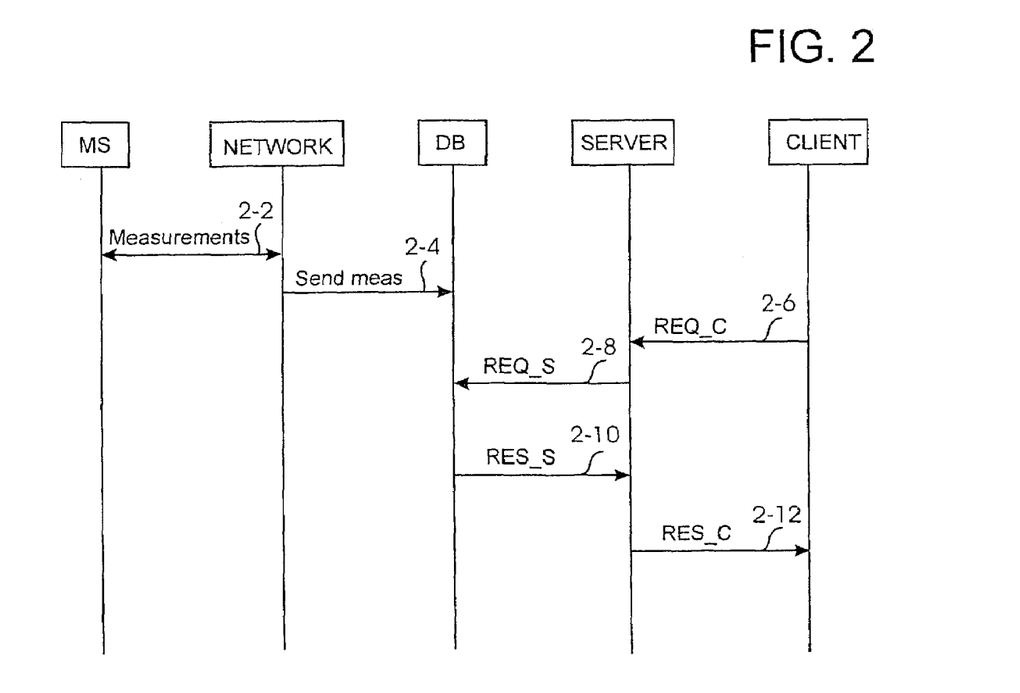
FIG. 2 is a diagram illustrating signalling between a mobile station, a telecommunication network and a client.

FIG. 2 shows a signalling diagram between a mobile station, a telecommunication network and a client. In step 2—2, the location of the mobile station MS is measured and the measurement results are transmitted to the telecommunication network to be processed by the network. In step 2-4, the measurement results to be stored, for instance the coordinates of GPS measurements, are transmitted to the database DB.

When a client CLIENT inquires the mobile station's location, in step 2-6 the client transmits a request (REQ_C) to the server, wherefrom the request is forwarded to the database in step 2-8 (REQ_S). In step 2-10, location data are returned from the database BD to the server and they are forwarded, either as such or after processing, to the client CLIENT in step 2-12 (RES_C). On the basis of the data, it is possible to select the information to be supplied to the client, for instance a street name or a target square in the grid of the map used by the client.

If the coordinate data stored in the database are transmitted as such to the server, the location of the mobile station can be inferred at the server, in a network element of the client or some other network element. The location of the mobile station can be inferred on the basis of the coordinates that were stored in the database prior to the client's request in step 2-6.

Figure 3:
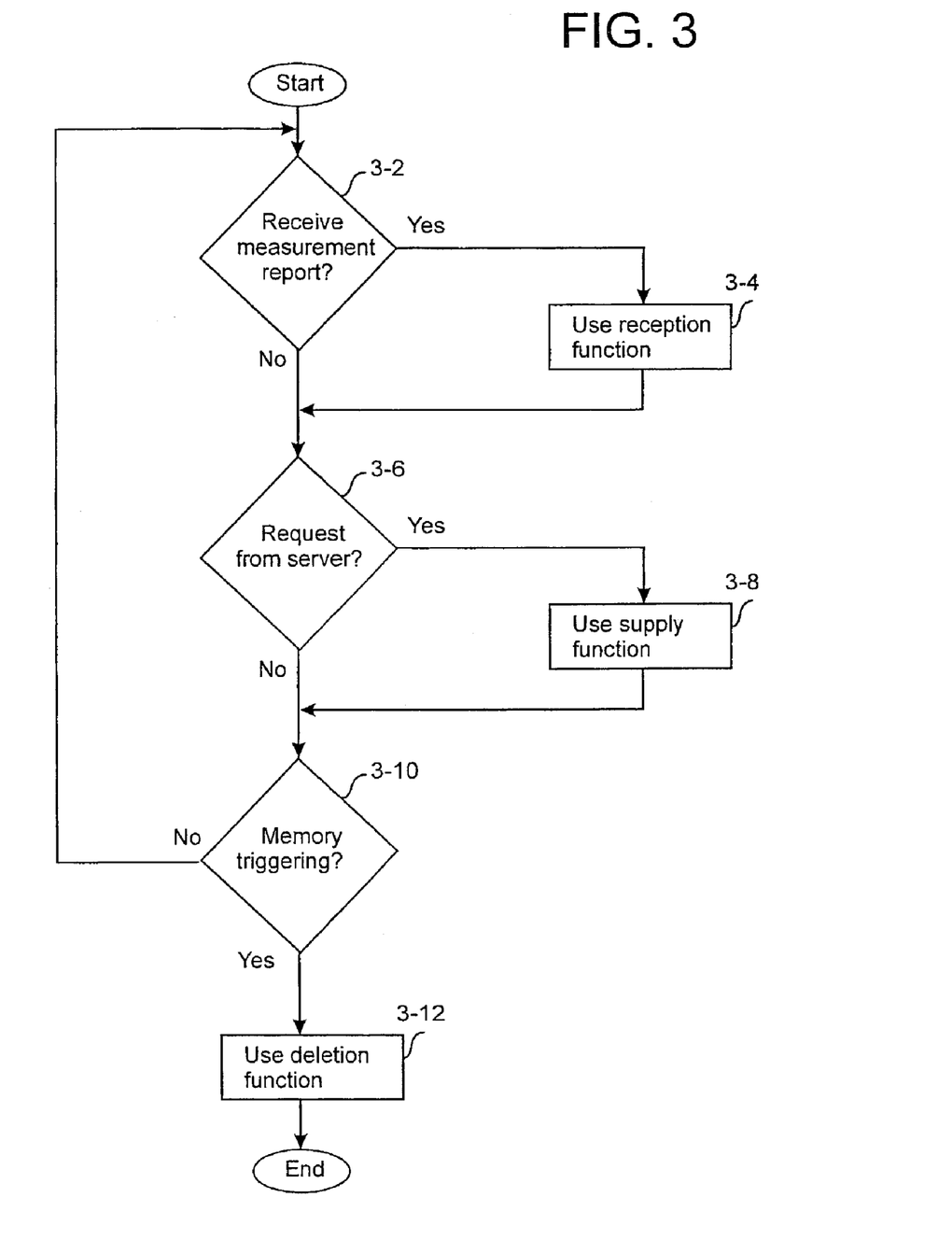
FIG. 3 shows some possible operations in a database for storing and deleting location measurement results.

FIG. 3 illustrates some possible operations how location measurement results are stored and deleted in the above-mentioned database. If the database receives information on arrival of a measurement report in step 3-2, step 3-4 is proceeded to, in which the measurement results are received. Otherwise, step 3-6 is proceeded to. It is then checked, whether a location measurement request has arrived from the server SERVER. If the request has arrived, step 3-8 is proceeded to, where the measurement results are transmitted, as such or after processing, to the client CLIENT. Otherwise, step 3-10 is proceeded to, for monitoring the state of memory. If any one of the preset conditions for deleting the stored data is fulfilled, step 3-12 is proceeded to, for performing a deletion routine of the measurement results. Otherwise, step 3-2 is returned to.

Figure 4A:
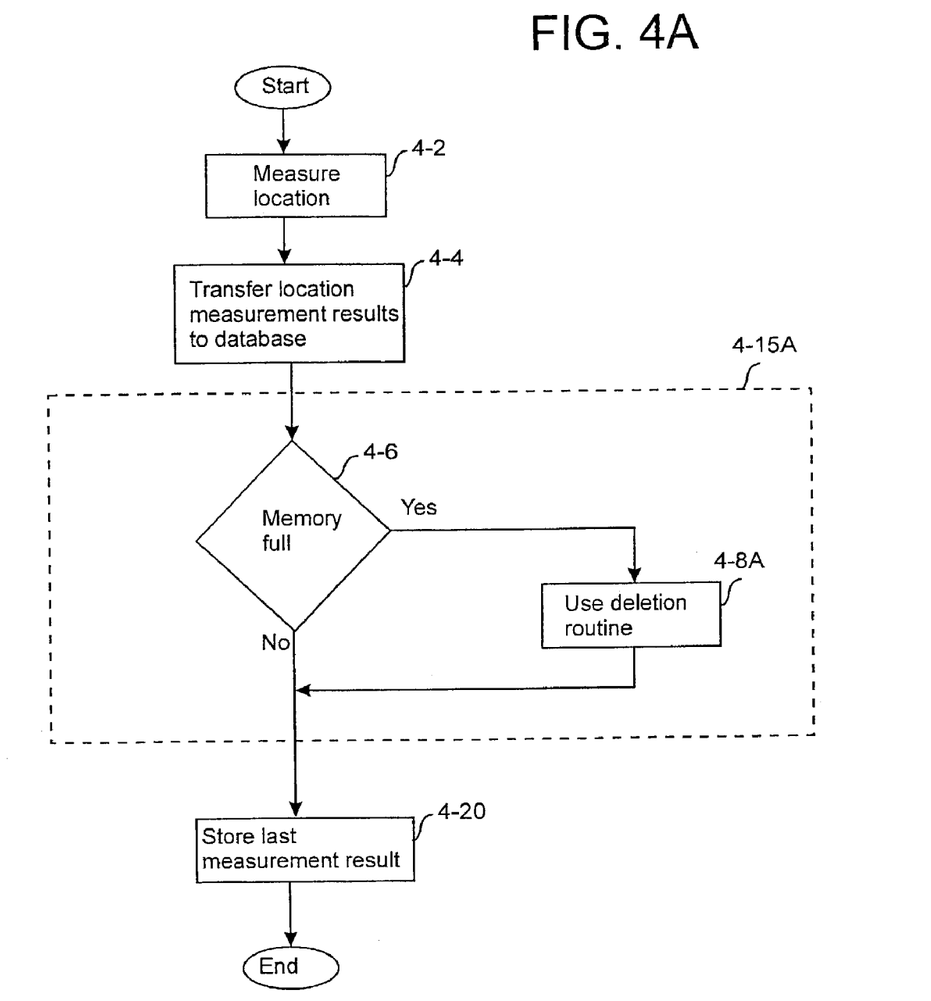
FIG. 4A shows how the location measurement results are stored and deleted according to one modification of the invention.

FIG. 4A illustrates how location measurement results are received and deleted according to an alternative modification of the invention. In step 4-2, the location of the mobile station is measured and the measured location data are transferred to the database DB in step 4—4. It is checked in step 4-6, whether the memory designated for one mobile station is full of location measurement results or not. If the memory is full, a deletion routine of stored location measurement results is started in step 4-8A. If the memory is not full, the latest measurement result is stored in step 4-20.

Figure 4B:
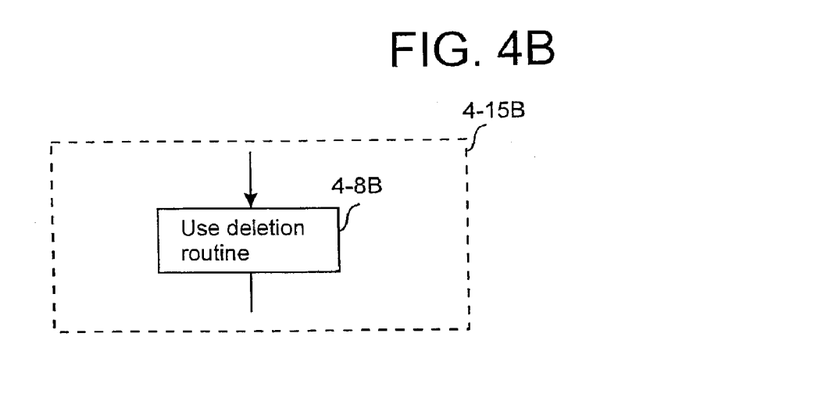
FIG. 4B shows how the location measurement results are deleted according to one modification of the invention.
Figure 4C:
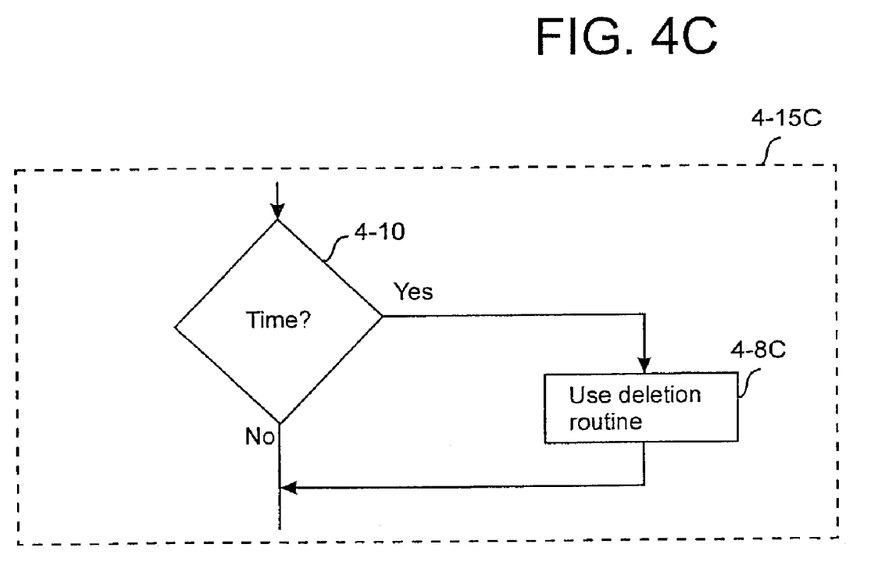
FIG. 4C shows how the location measurement results are deleted according to one modification of the invention.

Steps 4-6 and 4-8A can be referred to as a deletion step of old location measurement results, i.e. step 4-15A. FIGS. 4B and 4C show two other deletion steps according to other preferred modifications of the invention, namely steps 4-15B and 4-15C.

Instead of checking whether the memory designated for one mobile station is full of location measurement results or not, alternatively, it is possible to delete a previously stored location measurement result prior to storing a new location measurement result. In this manner, it can be ensured that the database will not grow excessively in size. This is described by step 4-8B in FIG. 4B.

According to yet another modification in FIG. 4C, prior to storing the new location measurement result it is checked in step 4-10, whether a given time has elapsed from a previous deletion of at least one location measurement result or from a previous checking of the number of location measurement results, if yes, a deletion routine of the location measurement results is started in step 4-8C.

The deletion routine of the location measurement results can also be started if there is available computing capacity in the system (System Idle).

FIRST EMBODIMENT

In accordance with a first embodiment of the invention, an aim is to delete measurement results corresponding to locations between which the mobile station has moved least. For this purpose, the location measurement results can be stored in the database DB as coordinate data (x-coordinate, y-coordinate).

Each stored location data of the mobile station can be described by a geometrical location data of a distance parameter calculated from the coordinate data in relation to other measurement data or a fixed point, i.e. location data, for instance by a distance parameter in relation to an adjacent location data item.

Said distance parameter can be determined in a variety of ways. For instance, it can be the distance from a location corresponding to location data to a location corresponding to a preceding or a subsequent location data. The distance parameter can also be a quantized, i.e. classified, version of the distance. If the distance parameter is calculated with respect to adjacent location data, it is naturally sufficient to calculate the distance in one direction only, for instance to a location corresponding to the next newest location data, because the distance from A to B equals the distance from B to A. Primarily, the aim is to delete the location data with corresponding locations in close proximity to one another since a plurality of locations in close proximity to one another do not provide better information than one location. In view of this embodiment, the essential for the distance parameters is that they allow to infer which location data describe locations in close proximity to one another.

Since calculating a distance parameter is based on a measurement result of a mobile station location with relation to other measurement results of the same mobile station, the distance parameter(s) must be re-calculated every time a new measurement result is obtained, i.e. when the mobile station has moved to a new position.

SECOND EMBODIMENT

In accordance with a second embodiment of the invention, an aim is to delete measurement results corresponding to measuring moments whose intervals exceed a given threshold value. For this purpose it is possible to store an age parameter in the database DB, for instance a measuring moment of geographical location data of a distance parameter, for instance as time data.

Figure 6:
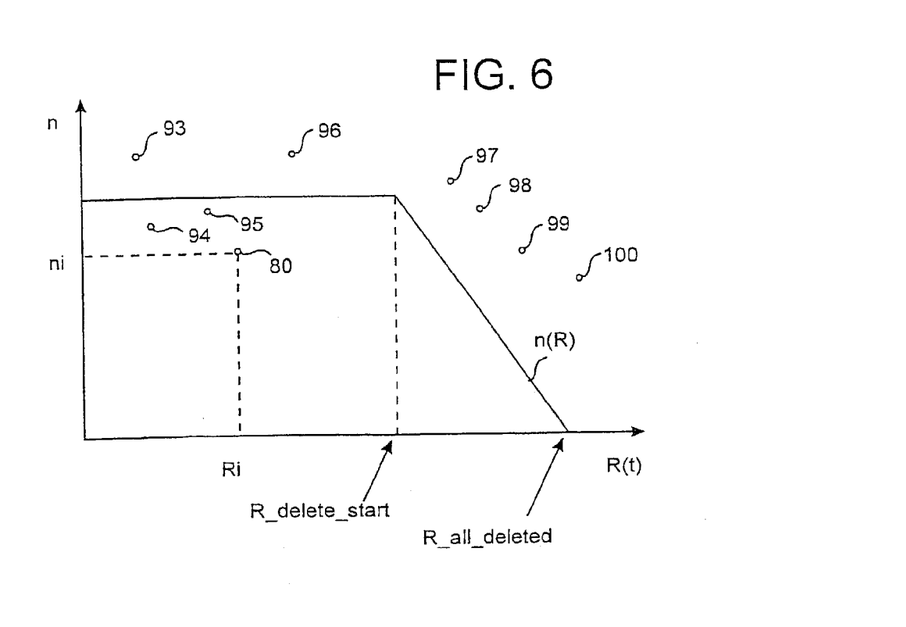
FIG. 6 shows the location measurement results in R(t)–n coordinate system.

FIG. 6 shows a target function n(R) of location measurement results in a memory as a function of a measuring moment n(R(t)). Alternatively, the target function n(R) could also be described as a function of the measuring moment and the geographical location data of the measurement results n(R(t,x)). In FIG. 6, the x-axis shows an age parameter value of the measurements and the y-axis shows the number of the measurement results. For instance, ni measurement results are stored in the memory at an age parameter value Ri (80). Other reference numerals 93 to 100 denote the number of measurement results at other age parameter values.

It appears from the figure that as the measurement results are sufficiently far away in time, i.e. they exceed a predetermined threshold, deletion of measurement results starts at point $R_{delete\_start}$.

The target function n(R) thus describes the target number of measurement results at each age parameter value R(t) exceeding the threshold value. Measurement results can also be deleted randomly or by using a weighted average. The measurement results to be deleted can be selected from a larger set of measurement results, for instance a subset of D, for which measurement results $R \approx R_{del}$ for instance by randomly using a weighted-average-type solution or by aiming at a desired distribution.

All points close to point $R_{del}$ can be described by set D according to equation 1

$$D=\{(x,t)_i | \|R-R_{del}\| < \epsilon\} \qquad (1)$$

where $\epsilon$ is dependent on the discretion used. If the number of measurement results is great, it is possible, in practice, to affect history resolution which improves as $\epsilon$ decreases.

The measurement results to be deleted $D_{del}$ are selected from set D such that the number of measurement results after deletion is given by equation 2.

$$n_i^{AFTER} = n(R_i) \qquad (2)$$

The target function $n(R_i)$ can also be determined asymmetrically, e.g. for a discrete interval $[R_{i-}, R_{i+}]$ according to equation 3.

$$n(R_i) = \max n(z), z \text{ belonging to } [R_{i-}, R_{i+}] \qquad (3)$$

It is possible to illustrate a deletion operation by assuming that there are $n_i$ location measurement results. The number of measurement results $(n_i - n(R_i))$ representing the difference of the number of location measurement results and the target function is deleted from these results at a discrete interval $[R_{i-}, R_{i+}]$.

Values for the target function can be set for instance as follows:

1) $n(R_i) = \max\_n$, if the distance function R is less than the value which starts deletion of the measurement results = $R_{delete\_start}$;

2) $n(R_i) = n_{max} - [(R_i - R_{delete\_start})/(R_{all\_deleted} - R_{delete\_start})] * n_{max}$
if the distance function R belongs to the interval $[R_{delete\_start}, R_{all\_deleted}]$;

3) $n(R_i) = 0$, if all location measurement data are deleted $R_{all\_deleted}$.

The actual shape of the target profile is defined in the above-mentioned step 2.

The distance function R(t) can be a logarithmic function, for instance, as in equation 4.

$$R(t) = a * \log(t) + b \qquad (4)$$

where R(t) is an age parameter value and t is a measuring time instant. In Formula 1, a and b are constants by which the parameters calculated from the measurement results can be suitably scaled, which might be necessary in the urban environment, for instance outdoors and indoors, as the scale of movement and speed changes.

The distance function R can thus be expressed as a logarithmic function according to Formula 4 and by utilizing said logarithmic deletion routine it is possible to delete a greater number of older measurement results than newer measurement results. This ensures that a greater number of newer measurement results than older ones are stored.

Generally, the target function $n(R_i)$ is determined on the basis of the results obtained in field tests in various environments by comparing the memory consumption in storing various paths and by constructing history for variously optimized parameters. Because in the example, R includes the optimization parameters, in selecting the constants a and b, it is possible to use an up-and-down method, for instance, for determining a correct interval for parameter values. A constructed path is compared with paths of the field measurements.

In the near future, an aim is to provide the parameter estimates completely by calculation, so that changing them dynamically, for instance, by clock time or a statistical model, will facilitate to select a correct size for the database. Parameter estimation can also be implemented user-specifically such that the initial estimation values are tagged in a user profile, for instance. So far, computing capacity in a typical home location register HLR is not sufficient to perform this, but it is possible to implement calculation of parameters to be stored in the home location register HLR by another computer connected to the network or home location register HLR. In that case, parameters are provided at the same time, for instance, for a given user group. Location data management according to the embodiments and modifications of the invention can be utilized in intelligent network IN applications.

As appears from the above-described embodiments of the invention, instead of processing the measurement results, for instance, by attaching, prior to storing in the database, a parameter calculated by means of a distance- and/or time-based mathematical function implementing the basic idea of the invention to data corresponding to said measurement results, the measurement results can also be processed after storing them in the database.

Figure 5:
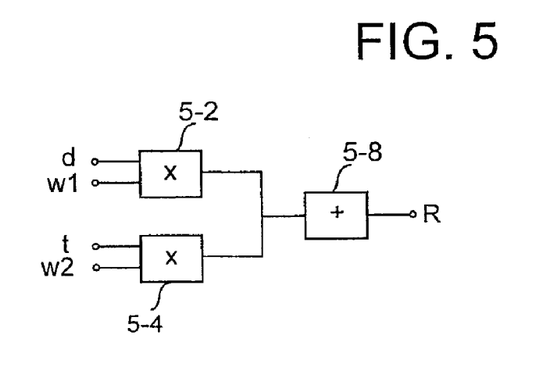
FIG. 5 illustrates mathematical processing of the location measurements.

FIG. 5 illustrates combining the first and the second embodiments, i.e. deleting the measurement results on the basis of a random combination of distance and age parameters, for instance, on the basis of the weighted combination thereof. According to FIG. 5, geographical distance d from one location measurement result of the mobile station to a next one can be multiplied by a first weighing coefficient W1 in element 5-2. Similarly, geographical distance from a second location measurement result of the mobile station to a measurement result subsequent to said second location measurement result can be multiplied by the first weighting coefficient W1. The shorter the distance between the measurement results, the lower the previous measurement result value of the mobile station used in measuring the geographical distance.

If measuring moments of the measurement results are also to be utilized in deleting the location data, time t when the measurement result of the mobile station is measured can be multiplied by a second weighting coefficient W2 in element 5-4. These two measurement results processed with the above-mentioned weighting coefficients can be summed in element 5-8. The obtained calculation result is R, which describes the calculated distance that is calculated by a random function from a location difference and time. The significance of the distance function R lies in that its value allows to select the location data to be deleted to the effect that the target function n(R) will be achieved.

The value of the distance function thus describes a reference on the basis of which any one the stored measurement results is deleted before storing a next measurement result, for instance. A measurement result with a lower value will be deleted before a measurement result with a higher value. If two measurement results have the same value, the older one of the measurement results will be deleted. After deleting the location data having the lowest value, the measurement results in the database can be processed, for instance, such that the remaining measurement results are compressed in sequence of measuring time.

Measurement results are thus deleted depending on the value of the target function n(R). If the target function is a declining function, fewer of the measurement results of the lower distance function R(t,x) are deleted than of those of the higher distance function.

Deleting a measurement result need not be a separate step, but old measurement data can simply be deleted by writing a new data item in the same memory location.

The invention does not actually improve the accuracy of location determination, but generally, in many cases, selection of the target function n(R) and the distance function R(t,x) allows to improve the interpretation of the location determination by excluding outside the error margin the areas where the mobile station cannot be located in view of natural or other obstacles and the history of the location data. The improved interpretation of the location measurement results is illustrated in FIGS. 7 and 8.

Figure 7:
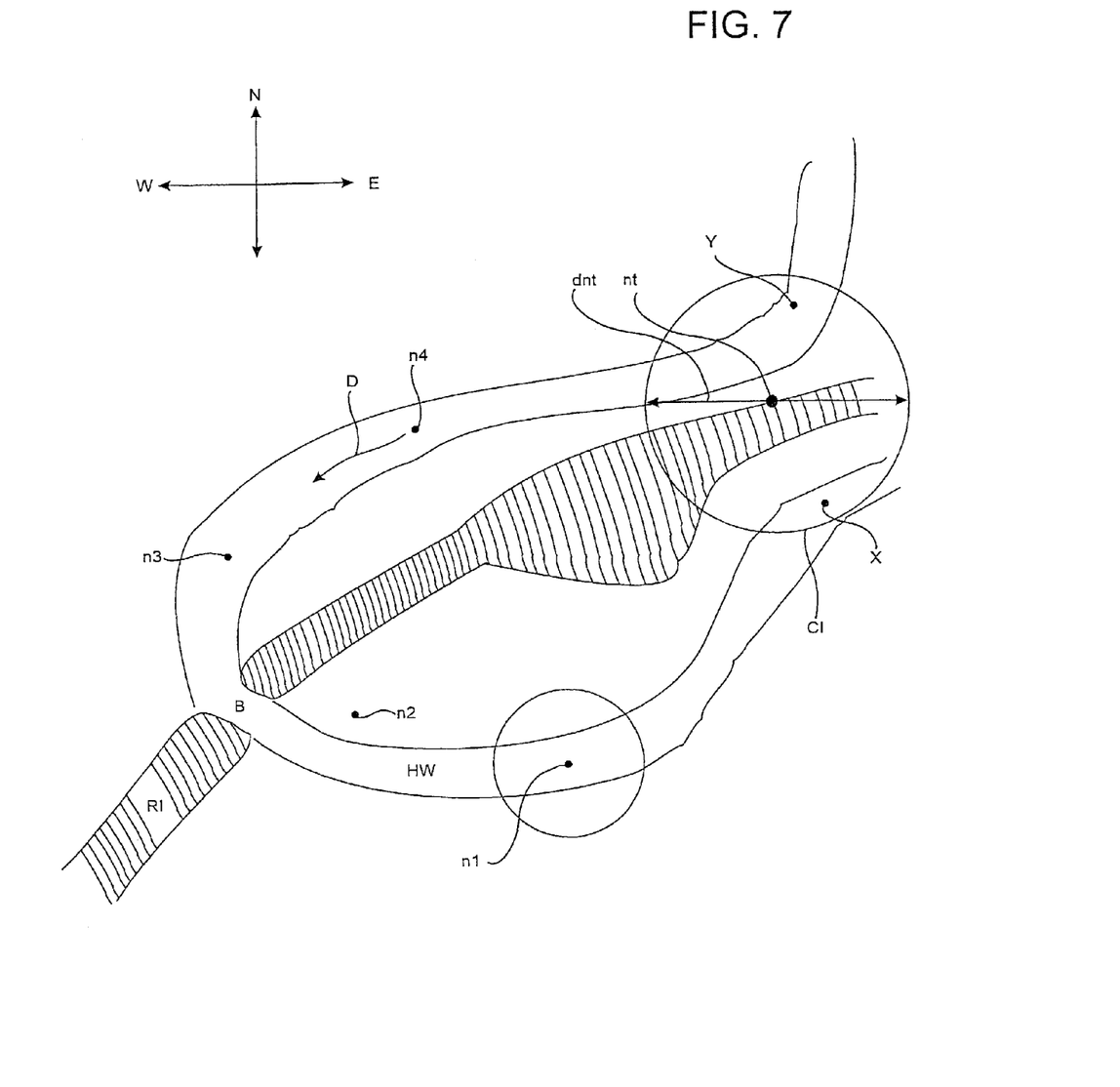
FIG. 7 shows how the location measurement results are interpreted.
Figure 8:
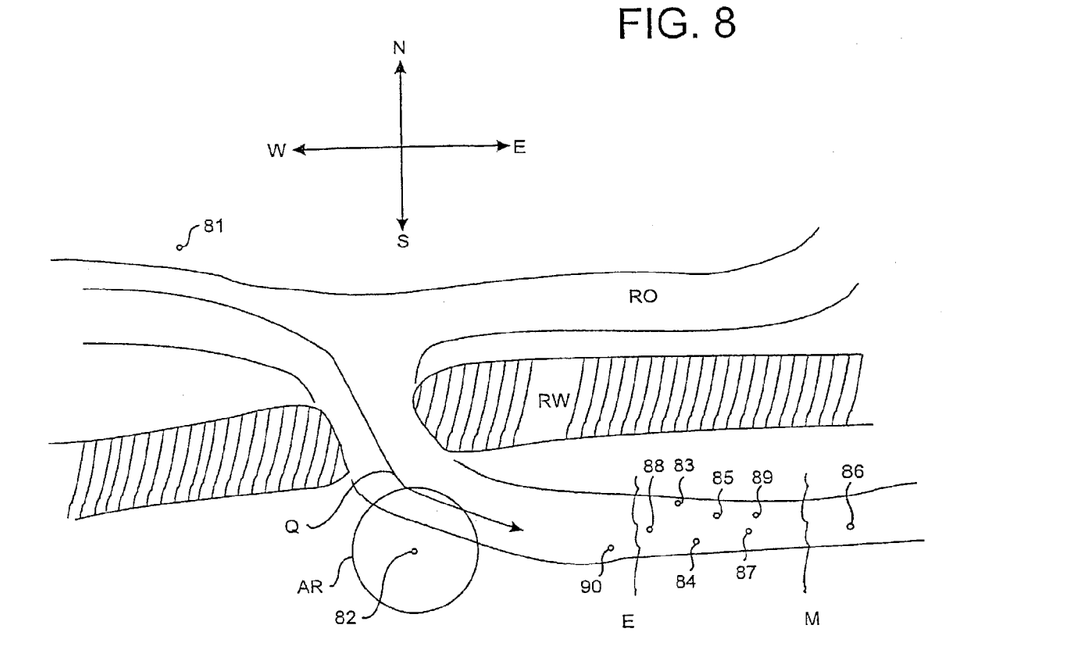
FIG. 8 shows how the location measurement results are interpreted.

In FIG. 7, the mobile station located in a vehicle travels in the direction of arrow D on a road HW in the vicinity of a river RI. The location of the mobile station is measured and the measurement results of points n4, n3, n2 and n1 are stored in any of the above-described manners.

At point X, the mobile station stops because of a traffic accident and in step 2-6 (see FIG. 2), the regional emergency centre transmits a request for determining the location of the mobile station that placed the emergency call. By one-point method used in the prior art it is not possible to determine on which side of the river the mobile station is located, since circle CI within the measuring accuracy extends on either side of the river RI. In step 2-12, the regional emergency centre receives the stored location measurement results n4, n3, n2 and n1 of the mobile station. Said measurement results can be interpreted such that according to the age of the measurement results it is possible to infer that the mobile station has travelled in the direction of arrow D;

the mobile station's site of accident at point X is located on the east side of the river, because the mobile station has travelled in the direction D and at least one relatively new measurement result n1 is definitely from the east side of the river, even though the uncertainty dnt of the measurement result at point nt is so great that when interpreting only one location measurement result, it could have been possible to interpret quite as well that the accident happened at point Y, because all the points inside circle CI are just as likely to be the correct location value of the mobile station. However, on the basis of the measurement history, the location cannot exist beyond the river: the area covered by circle CI lacks suitable access over the river RI, and on the basis of the time stamps of the measurement results, the vehicle did not have time to go back to point Y via bridge B.

FIG. 8 illustrates interpretation of the location measurement results when the mobile station in a vehicle travels in the direction of arrow Q on a road RO in the vicinity of a railway RW. The oldest, known location measurement result of the mobile station is from point 81. Therefrom the mobile station has proceeded to area AR of location measurement point 82. At moments that follow, a plurality of measurement results 83 to 93 are received from the area between points E and M. If said location measurement results were weighted only with respect to the measuring instant, the history of the location measurement results would not necessarily allow to infer the vehicle's direction of arrival. Therefore, the location measurement results are also weighted with respect to the location.

It is obvious to the person skilled in the art that with progress in technology the basic idea of the invention can be implemented in a variety of ways. The invention and its embodiments are thus not restricted to the examples described above but they can vary within the scope of the claims.

The invention claimed is:

1. A method for managing location measurement data, the method comprising:
   for at least one mobile station, determining and maintaining in a memory, multiple mobile-specific location records such that the multiple mobile-specific location records indicate a location history of the mobile station in question;
   for each of the mobile-specific location records, assigning a corresponding optimization parameter;
   using the assigned optimization parameters to choose which mobile-specific location records of the mobile station are to be deleted from the memory and deleting the chosen mobile-specific location records;
   wherein the optimization parameter comprises at least one of:
      a distance parameter that favours weighted deletion of mobile-specific location records corresponding to locations between which the mobile station has moved least; and
      an age parameter that favours weighted deletion of old mobile-specific location records.

2. The method of claim 1, wherein maintaining an individual location record is at least partly based to other location record.

3. The method of claim 1, wherein said maintaining of an individual location record comprises replacing the individual location record with a new value based at least on one other location record.

4. The method of claim 3, wherein the replacing is based at least on time of measurement of the location record to be replaced.

5. The method of claim 1, wherein at least geographical location data is used in calculating the mobile-specific location record.

6. The method of claim 1, wherein the mobile-specific location record is determined with respect to a fixed point.

7. The method of claim 1, wherein the mobile-specific location record is determined with respect to other location measurement data.

8. The method of claim 1, wherein the mobile-specific location record is calculated by using at least a measuring moment.

9. The method of claim 8, wherein the age parameter is determined with respect to the measuring moment.

10. The method of claim 1, wherein the location measurement data management is at least partly based on monitoring a state of the memory.

11. The method of claim 1, wherein the location measurement data management is at least partly based on monitoring a state of the system.

12. The method of claim 1, wherein the location measurement data management is at least partly based on use of a timer.

13. Equipment for managing location measurement data, the equipment being arranged to determine and maintain in a memory multiple mobile-specific location records for at least one mobile station such that the multiple mobile-specific location records indicate a location history of the mobile station in question, wherein the equipment is further arranged to assign a corresponding optimization parameter for each of the mobile-specific location records and use the assigned optimization parameters to choose which mobile-specific location records of the mobile station are to be deleted from the memory and delete the chosen mobile-specific location records, wherein the optimization parameter comprises at least one of a distance parameter that favours weighted deletion of mobile-specific location records corresponding to locations between which the mobile station has moved least, and an age parameter that favours weighted deletion of old mobile-specific location records.

14. The equipment of claim 13, wherein the equipment is located in a mobile system.

15. The equipment of claim 14, wherein the equipment is located in a home location register.

16. The equipment of claim 14, wherein the equipment is located in a visitor location register.

17. The equipment of claim 14, wherein the equipment is located in a mobile station.

\* \* \* \* \*